(No Model.)
F. RHIND & J. FARTHING.
Hydrogen Lamp.
No. 232,848.  Patented Oct. 5, 1880.
2 Sheets—Sheet 1.
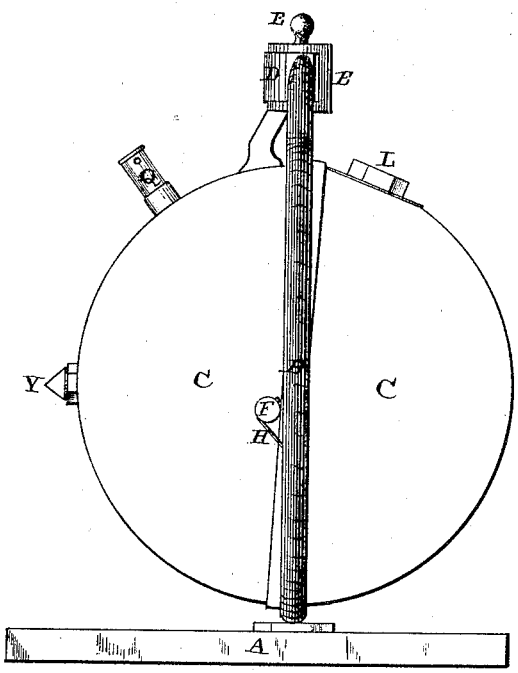
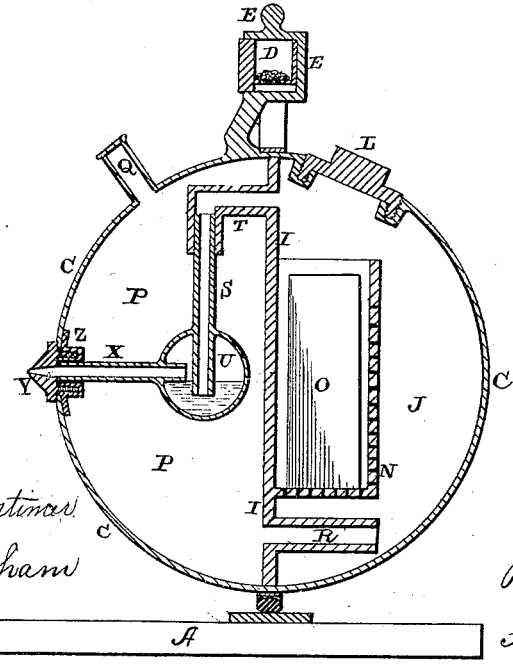
Witnesses
Wm W. Mortimer
Chas. H. Isham
Inventors
Frank Rhind,
Jno. Farthing.
per
F. A. Lehmann,
Atty (No Model.)

F. RHIND & J. FARTHING.
Hydrogen Lamp.

No. 232,848.

2 Sheets—Sheet 2.

Patented Oct. 5, 1880.

Witnesses
W. W. Mortimer
C. H. Isham

Inventors
Frank Rhind,
Jno. Farthing,
per
F. A. Lehmann,
Atty.

UNITED STATES PATENT OFFICE.

FRANK RHIND, OF BROOKLYN, AND JOHN FARTHING, OF NEW YORK, N. Y.

HYDROGEN-LAMP.

SPECIFICATION forming part of Letters Patent No. 232,848, dated October 5, 1880.

Application filed August 3, 1880. (No model.)

*To all whom it may concern:*

Be it known that we, FRANK RHIND, of Brooklyn, in the county of Kings, and JOHN FARTHING, of New York, in the county of New York, and State of New York, have invented certain new and useful Improvements in Hydrogen-Lamps; and we do hereby declare the following to be a full, clear, and exact description of the invention, such as will enable others skilled in the art to which it pertains to make and use it, reference being had to the accompanying drawings, which form part of this specification.

Our invention relates to an improvement in hydrogen-lamps for lighting cigars and taking the place of matches generally; and it consists in a suitable tilting vessel having a partition which divides it into two parts, one of which parts contains the zinc and the gas which is generated therefrom by the action of an acid, and the other part contains only air, a portion of the acid, the tubes through which the gas escapes, and the sealing medium, whereby, whenever the tilting vessel is turned over upon one side, the gas will escape against a piece of platinum sponge and thus become ignited, as will be more fully described hereinafter.

The object of our invention is to furnish a lamp which, by simply turning it upon one side, will instantly strike a light for the purpose of lighting a cigar, a piece of paper, or other similar substances, and thus entirely doing away with the use of matches in the house.

Figure 3:
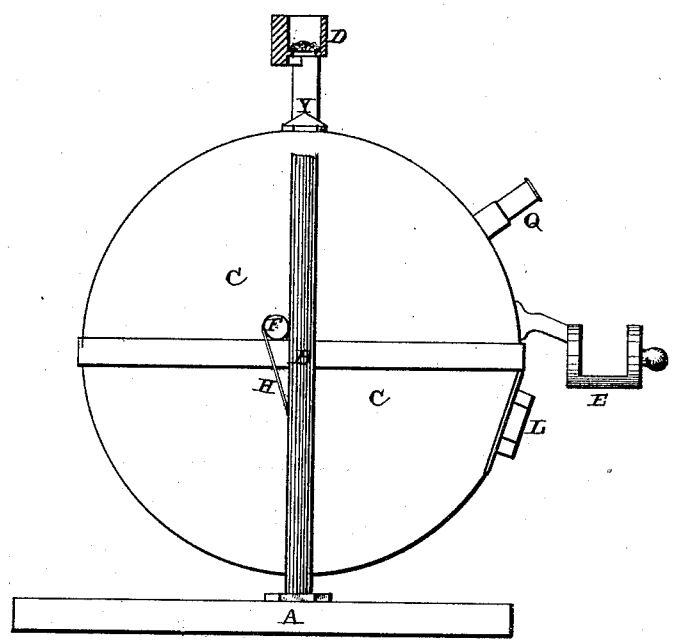
Figure 4:
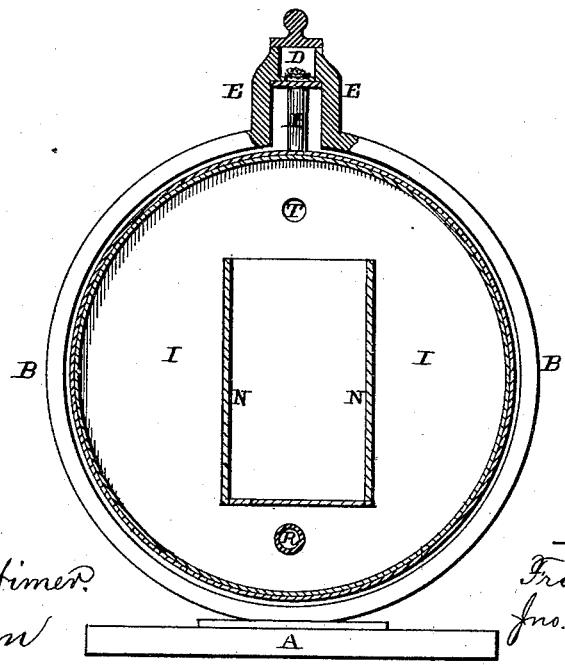

Figure 1 is a side elevation of our invention. Fig. 2 is a vertical longitudinal section of the same. Fig. 3 is a side elevation of the lamp, showing the vessel tilted back. Fig. 4 is a vertical section of the lamp, taken at right angles to Fig. 2.

A represents a suitable base, upon the top of which is secured the hoop or circle B, in which the tilting vessel C is pivoted. In the upper portion of this hoop is secured a ring, D, in which is placed a piece of platinum sponge for the gas escaping from the vessel to strike against for the purpose of making the sponge red hot and igniting the gas.

The vessel C is here preferably shown as having a spherical form, but it is evident that any other form that may be preferred may be used equally as well. Upon the top of this vessel is secured the handle E, which is so formed as to act as a cover for both the top and the bottom of the ring in which the platinum sponge is held, whereby the sponge is protected from dirt, dust, and all foreign substances. By means of this handle the vessel can be tilted over to one side until the stop F strikes against the side of the ring and stops all further motion. Secured to this stop and the hoop is a suitable spring, H, by means of which the vessel is instantly returned to position as soon as it is released. If so desired, a piece of rubber or other suitable spring may be placed upon the side of the ring next to the handle for the purpose of preventing a concussion when the vessel is released. Inside of this vessel C is placed an air-tight partition, I, which divides the vessel into two separate and distinct compartments. Through the side of the compartment J is a tight-fitting plug or cover, L, through which the water and acid, in the proportion of about one part of acid and eight of water, is poured. In this compartment J is placed the perforated holder N, in which is placed the piece of zinc O. The acid and water, which about one-half fill the vessel, acting upon the zinc, generate a gas, which collects in the top of this chamber J. In the chamber P the acid rises as high as it does in the chamber J, when the acid and water is first poured in, but in proportion as the gas is generated the acid and water is forced by the pressure of the gas upon its top over into the chamber P.

A connection is made between the two chambers J P by means of the horizontal pipe R, which pipe extends a suitable distance to one side of the partition, so that its lower end will always be immersed in the acid and water, and thus prevent the gas from passing into the chamber P. Through this side of the chamber P, near its top, is made a suitable pipe, Q, which is closed at its outer end, and through the side of this pipe is made a small hole for the air to pass freely through.

When the vessel is tilted over upon one side, so as to cause the acid and water to flow from the chamber P into the chamber J, the air is flowing freely into the chamber P, for the purpose of preventing a vacuum from being formed, and so that the acid and water will move freely back and forth. After the chamber has been tilted over upon one side for the purpose of igniting the gas, and is returned to position again, the acid and gas return to the chamber P and force the air out through the opening in the pipe Q, which air has just passed in while the water and acid was running into the chamber J.

Through the top of the partition is made a hole for the gas to escape, and to this partition, at the hole, is secured an elbow-pipe, T, through which the gas passes. This pipe extends horizontally through the top of the chamber P for the greater part of its length, for the purpose of being as high as possible above the liquid and thus keeping the gas dry. Secured to the lower end of the turned-down portion of this pipe T is a glass pipe, S, the lower end of which terminates in a bulb, U, which is partially filled with quicksilver, glycerine, or any other suitable sealing medium. Extending horizontally outward from the side of this bulb U, which contains the sealing medium, is another glass pipe, X, which has its outer end connected with the nozzle Y, which has a very minute orifice for the gas to escape through. The inner end of this pipe X extends a suitable distance into the bulb, so that when the vessel is tilted over upon its side the sealing medium will settle around its side without escaping out of the bulb, which it otherwise would do if this end did not extend inward beyond its side.

As the lower end of the pipe S is kept constantly sealed while the vessel C is in its natural position, it is evident that none of the gas which is generated in the chamber J can escape through the tube S until the vessel is tilted back sufficiently far to unseal its end; but after the vessel has been tilted back far enough to uncover this end the gas begins to escape through the nozzle and drives out all of the air that is in the pipe, so that by the time the nozzle is brought under the ring the gas is escaping strong and pure. As this gas comes in contact with the platinum sponge the sponge at once becomes red hot and ignites the gas, so that a flame is at once formed and continues to burn as long as there is any gas in the compartment J, or until the vessel has been tilted back far enough to again seal the lower end of the pipe S. While the gas is escaping from the nozzle the acid and water are running from the chamber P into chamber J, and, being in contact with the zinc, more gas is generated. As this gas is being generated it is constantly forcing the acid and water back into the chamber P until the water and acid no longer come in contact with the zinc, and then the production of gas at once ceases until the vessel is again tipped over upon one side.

Secured to the inner side of the vessel C is a socket, Z, into which the nozzle screws, and which has the outer end of the glass pipe secured in it.

The vessel C may be made of glass or any other suitable material which is not affected by an action of the acid, or it may be made of brass or any other sheet metal which is coated or lined upon its inner side, so that the acid will not affect it.

The great advantage of our invention over all hydrogen-lamps which have ever been made heretofore consists in entirely doing away with all joints, cocks, and other such applications, and substituting therefor a liquid sealing medium which prevents all escape or passage back and forth with absolute certainty.

Where a liquid sealing medium is not used the lamp will work correctly, but for a very short time, and then the gas begins to leak or escape to such an extent that the lamp becomes useless. Where a liquid sealing medium is used, as here shown, it is impossible for the gas to leak out of the chamber in which it is formed, no matter how much the lamp is used nor how long it is left to stand unused.

Although the chamber C is provided with journals, so that it will tilt, it is evident that it is only necessary to make the sealing medium tilt without moving the chamber, so as to accomplish the same result. The tilting chamber is preferred for many reasons; but, as above stated, it is not necessary that this chamber should always be made to tilt as shown.

Having thus described our invention, we claim—

1. In a hydrogen-lamp, the combination of a supporting-base, a hoop or ring, B, provided with a ring, D, for holding the platinum sponge, and a tilting vessel, C, provided with a nozzle, Y, for the escape of the gas, whereby when the vessel is tilted over on one side the nozzle will be brought under the sponge, substantially as shown.

2. In a hydrogen-lamp, the combination of the hoop B, provided with a ring, D, for holding the platinum sponge, with the tilting vessel C, provided with a handle, E, which serves to close the ring at both top and bottom, substantially as described.

3. The combination of the hoop B and vessel C, pivoted therein, with a stop and a spring, substantially as set forth.

4. The tilting vessel C, provided with a partition, and having an opening through the partition at its top and bottom for the passage of the acid and water and the gas, substantially as specified.

5. The tilting vessel C, provided with a partition, and having a pipe connected to the partition at its lower end for the purpose of preventing the gas from escaping from the chamber J into the chamber P, substantially as shown.

6. The tilting vessel C, provided with a partition, so as to divide it into two separate chambers, in one of which is placed a piece of zinc, in combination with a pipe for conducting the gas to the nozzle, and a liquid sealing medium placed in a bulb in the pipe, between the nozzle and the top of the chamber J, substantially as described.

7. A tilting chamber provided with a partition for dividing it into two separate compartments, and having an opening through the bottom of this partition for the passage back and forth of the acid and water, and a pipe leading from the top of this chamber, which is provided with a sealing medium, whereby when the vessel is tilted the passage of the acid and water from one chamber into the other will serve to force the gas from the chamber J to the nozzle, substantially as specified.

8. In a hydrogen-lamp, the combination of the two glass tubes, a bulb, and a sealing medium, the inner ends of the tubes being made to extend some distance into the bulb, substantially as shown.

9. A hydrogen-lamp provided with a liquid sealing medium for the purpose of preventing the escape of the gas from the chamber in which it is generated, substantially as set forth.

In testimony that we claim the foregoing we have hereunto set our hands and seals this 21st day of July, 1880.

FRANK RHIND. [L. S.]
  JOHN FARTHING. [L. S.]

Witnesses:
 WM. APGAR,
 JOHN WALKER.